US012793595B2

(12) United States Patent
Kim et al.

(10) Patent No.: US 12,793,595 B2
(45) Date of Patent: Nov. 10, 2026

(54) ELECTRONIC DEVICE AND METHOD FOR PREVENTING SCREEN BURN-IN ON DISPLAY

(71) Applicant: Samsung Electronics Co., Ltd., Suwon-si (KR)

(72) Inventors: Minseung Kim, Suwon-si (KR); Sangheon Kim, Suwon-si (KR); Hanyuool Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 18/798,125

(22) Filed: Aug. 8, 2024

(65) Prior Publication Data

US 2024/0404448 A1 Dec. 5, 2024

Related U.S. Application Data

(63) Continuation of application No. PCT/KR2023/001845, filed on Feb. 8, 2023.

(30) Foreign Application Priority Data

Feb. 8, 2022 (KR) ........................ 10-2022-0016516

(51) Int. Cl.
*G09G 3/20* (2006.01)
*G06T 11/10* (2026.01)

(52) U.S. Cl.
CPC ............ *G09G 3/2007* (2013.01); *G06T 11/10* (2026.01); *G09G 2320/046* (2013.01); *G09G 2320/0666* (2013.01); *G09G 2340/0464* (2013.01)

(58) Field of Classification Search
CPC ......... G09G 3/2007; G09G 2340/0464; G09G 2320/0666; G09G 2320/046; G09G 5/003;

(Continued)

(56) References Cited

U.S. PATENT DOCUMENTS 9,625,987 B1 * 4/2017 LaPenna ............... G06F 1/3265
2013/0328825 A1 12/2013 Brown et al.

(Continued)

FOREIGN PATENT DOCUMENTS

JP 4886992 B2 2/2012
KR 20150064549 A 6/2015

(Continued)

OTHER PUBLICATIONS

Extended European Search Report dated May 7, 2025 issued in European Patent Application No. 23753148.8.

(Continued)

*Primary Examiner* — Phi Hoang
(74) *Attorney, Agent, or Firm* — Nixon & Vanderhye P.C.

(57) ABSTRACT

Various embodiments disclosed in the present disclosure relate to an electronic device and a method for preventing/reducing or avoiding screen burn-in on a display. According to an embodiment, the electronic device may comprise: a housing, a display, a memory, and at least one processor, comprising processing circuitry, electrically connected to the display and the memory. The electronic device may be configured to: set at least one content to be displayed in a first area of the display based on a cover mounted on a part of the housing being closed; generate an image to prevent or reduce burn-in occurring in the first area; correct at least one set content by applying the generated image; based on identifying that the cover is closed, control the display to display the at least one corrected content in the first area and (Continued)

a part of a boundary area of the first area. The first area may be a partial area of the display that is visible without being covered by the cover when the cover is closed.

16 Claims, 15 Drawing Sheets

(58) Field of Classification Search
CPC ... G09G 2320/0686; G09G 2310/0232; G09G 3/20; G09G 5/02; G09G 2320/0271; G09G 2340/04; G06F 3/0481; G06F 2200/1633; G06F 2200/1634; G06F 2203/04803; G06F 1/1624; G06F 1/1626; G06F 1/1652; G06F 1/1641; G06F 1/1677; G06F 3/04845; G06F 3/14; G06T 11/10; G06T 11/00; H04M 1/0214; H04M 1/0203; H04M 1/0245; H04M 1/72427; H04M 1/72454
See application file for complete search history.

(56) References Cited

U.S. PATENT DOCUMENTS

| | | | | |
|---|---|---|---|---|
| 2014/0274214 | A1* | 9/2014 | Kim | H04M 1/0266 455/566 |
| 2018/0048831 | A1 | 2/2018 | Berwick et al. | |
| 2019/0189048 | A1* | 6/2019 | Hong | G09G 5/393 |
| 2020/0218204 | A1* | 7/2020 | Koh | G04G 9/10 |
| 2021/0327103 | A1 | 10/2021 | Kim et al. | |
| 2021/0375239 | A1 | 12/2021 | Bae et al. | |
| 2022/0044607 | A1 | 2/2022 | Kim et al. | |
| 2023/0072388 | A1* | 3/2023 | Chiou | G09G 3/3208 |

FOREIGN PATENT DOCUMENTS

| | | | |
|---|---|---|---|
| KR | 20150064561 | A | 6/2015 |
| KR | 20150081394 | A | 7/2015 |
| KR | 20170109135 | A | 9/2017 |
| KR | 10-1981269 | B1 | 5/2019 |
| KR | 20190128843 | A | 11/2019 |
| KR | 20200108135 | A | 9/2020 |
| KR | 102195314 | B1 | 12/2020 |
| KR | 10-2021-0101089 | A | 8/2021 |
| KR | 102289274 | B1 | 8/2021 |
| KR | 102297459 | B1 | 9/2021 |
| KR | 102324566 | B1 | 11/2021 |
| KR | 102350097 | B1 | 1/2022 |
| WO | 2021050190 | A1 | 3/2021 |

OTHER PUBLICATIONS

International Search Report for PCT/KR2023/001845 mailed May 1, 2023, 5 pages (with English Translation).
Written Opinion of the ISA for PCT/KR2023/001845 mailed May 1, 2023, 6 pages (with English Translation).
Korean Office Action dated Jan. 5, 2026 for KR Application No. 10-2022-0016516.

* cited by examiner

ELECTRONIC DEVICE AND METHOD FOR PREVENTING SCREEN BURN-IN ON DISPLAY

CROSS-REFERENCE TO RELATED APPLICATIONS

This application is a continuation of International Application No. PCT/KR2023/001845 designating the United States, filed on Feb. 8, 2023, in the Korean Intellectual Property Receiving Office and claiming priority to Korean Patent Application No. 10-2022-0016516, filed on Feb. 8, 2022, in the Korean Intellectual Property Office, the disclosures of each of which are incorporated by reference herein in their entireties.

BACKGROUND

Field

The disclosure relates to an electronic device and method for preventing/reducing burn-in from occurring on a cover screen of a display in a closed state of a cover.

Description of Related Art

In recent years, various types of electronic devices have been developed and provided various services or functions, for the convenience of users.

Along with the development of various types of electronic devices, covers mounted to protect the electronic devices have also been provided in various forms. As an electronic device is equipped with a cover, a display of the electronic device may be covered to be protected, with a portion of the display exposed or visible through a hole in the cover. The electronic device may display a clock, a message, or set information on the portion of the display exposed by the hole in the cover.

With its cover closed, a conventional electronic device provides only a screen (e.g., a user interface (UI)) including an object such as text or an icon like a clock, a message, or set information on a portion (e.g., a cover screen) of a display, without providing an image (e.g., a wallpaper or an image file) representing various effects on a cover screen. Continuous display of the screen or display of an image (e.g., a wallpaper or an image file) on the cover screen may cause burn-in at the boundary of a used area of the cover screen due to a color difference and luminance difference between a display area used as the cover screen and an area unused as the cover screen.

SUMMARY

Embodiments of the disclosure may provide an electronic device and method for providing an image (e.g., a wallpaper or an image file) representing various effects on a cover screen of the electronic device, and preventing and/or reducing burn-in from occurring at the boundary of the cover screen.

According to an example embodiment of the disclosure, an electronic device includes: a housing, a display, at least one processor, comprising processing circuitry, memory storing instructions that, when executed individually and/or collectively by the at least one processor, cause the electronic device to: set at least one content to be displayed in a first area of the display in a closed state of a cover mounted on a portion of the housing, generate an image for preventing or reducing burn-in from occurring in the first area, and correct the at least one set content by applying the generated image, and based on identifying that the cover is in the closed state, control the display to display the at least one corrected content in the first area and a portion of a boundary area of the first area. The first area is a partial area of the display, visible without being covered by the cover in the closed state of the cover.

According to an example embodiment, a method of operating an electronic device includes: setting at least one content to be displayed in a first area of a display of the electronic device in a closed state of a cover mounted on a portion of a housing of the electronic device, generating an image for preventing or reducing burn-in from occurring in the first area, correcting the at least one set content by applying the generated image, and based on identifying that the cover is in the closed state, displaying the at least one corrected content in the first area and a portion of a boundary area of the first area. The first area is a partial area of the display, exposed without being covered by the cover in the closed state of the cover.

According to an example embodiment, because an image (e.g., a wallpaper or an image file) representing various effects on a cover screen of an electronic device is provided, and burn-in at the boundary of the cover screen is prevented and/or reduced, a user's perception of burn-in may be reduced, and the use time of light emitting elements of a display may be increased.

Various other effects identified directly or indirectly from the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation to the description of the drawings, the same or similar reference numerals may be used to denote the same or similar components.

DETAILED DESCRIPTION

With reference to the attached drawings, an electronic device according to various example embodiments will be described in greater detail below. The term user as used in various embodiments may refer to a person using an electronic device or a device (e.g., an artificial intelligence (AI) electronic device) using an electronic device.

Figure 1:
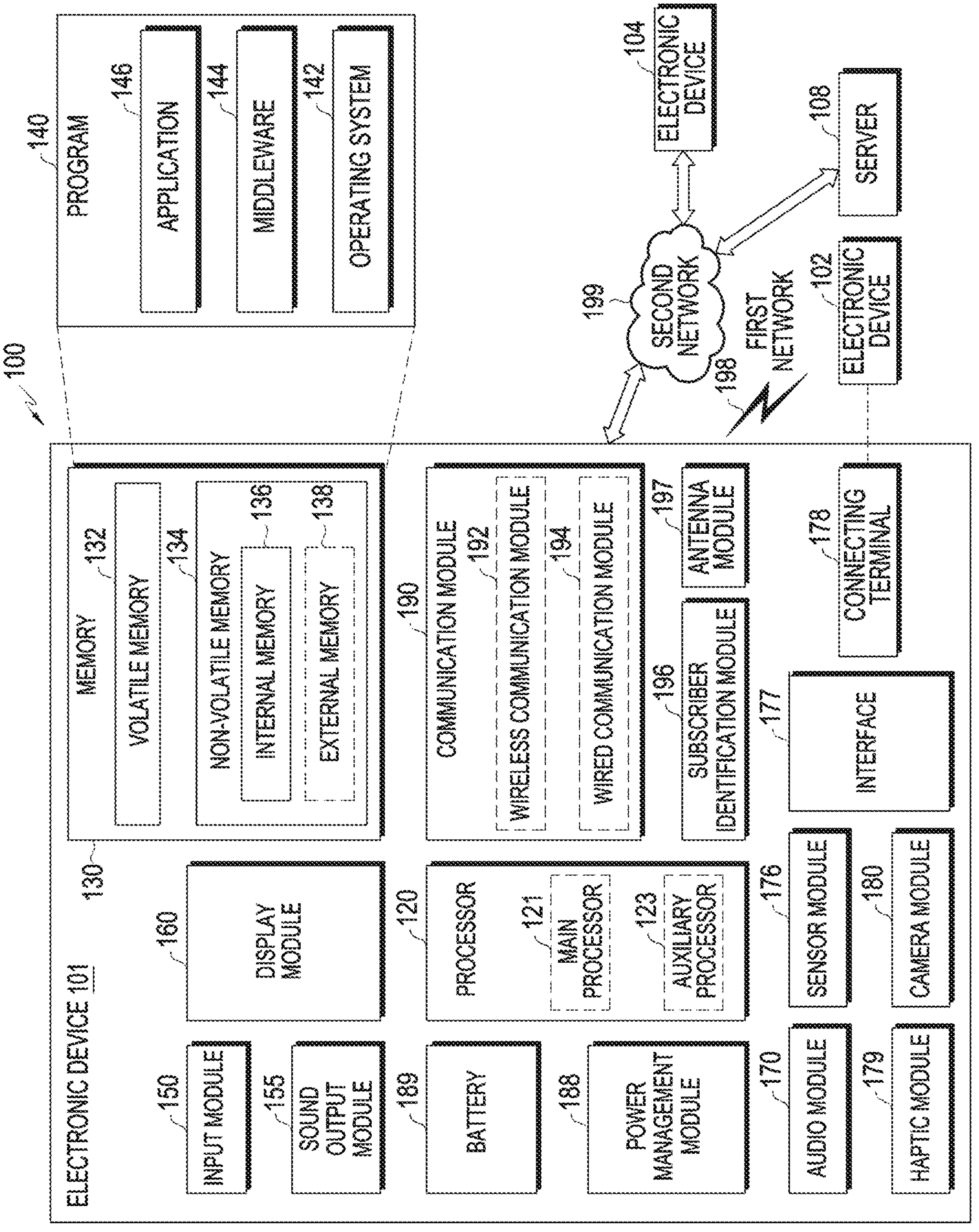
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIGS. 2A, 2B, 2C, and 2D are perspective views illustrating example configurations of an electronic device according to an embodiment.

Referring to FIG. 1 and FIGS. 2A to 2D, the electronic device 101 (e.g., the electronic device 101 in FIG. 1) according to an embodiment may be equipped with a cover 203 to cover a portion of a housing 201. The electronic device 101 may include a display 210 of the display module 160, which is disposed to be visually exposed on a front surface of the housing 201, the memory 130, and at least one processor 120, to which the disclosure is not limited. The electronic device 101 may further include other components described with reference to FIG. 1, for performing an operation for preventing/reducing or avoiding burn-in. The electronic device 101 may be configured in various types, not limited to the type illustrated in FIG. 1, and the number and shape of displays may vary according to the types of the electronic devices 101. According to the types of the electronic device, the cover 203 may be changed in shape, not limited to the shape illustrated in FIG. 2A, and areas of the housing 201 and the display 210 covered by the cover may be changed.

According to an embodiment, the cover 203 may include a first member 203*a* mounted to surround a rear surface and side surface (e.g., at least one of a top side surface, a bottom side surface, a left side surface, or a right side surface) of the housing 201 of the electronic device 101, and a second member 203*b* configured in a shape which may be opened and closed to cover a partial area of the display 210. The first member 203*a* of the cover 203 may include holes (not shown) for visually exposing components (e.g., a camera, a microphone, a speaker, a USB connector, and a button) configured in shapes visually exposed to the outside of the housing 201. The second member of the cover 203 may include a hole 205 configured to visually expose a first area (e.g., cover screen) 211 of the display 210 in a closed state. The first area 211 may be a partial area of the display 210, which is visually exposed without being covered by the cover 203 when the cover 203 is in the closed state. The first area 211 may be configured in a different size and position depending on the shape of the electronic device 101, and may be configured in a size equal to or larger than the size of the hole 205 included in the cover 203.

According to an embodiment, the at least one processor 120 of the electronic device 101 may execute an application for setting and editing at least one content to be displayed in the first area 211 of the display 210, which is activated as a cover screen when the cover 203 is in the closed state. The at least one processor 120 may receive content (e.g., at least one of a still image, a moving image, or an animated image to be used as a wallpaper or a background image) to be used as the at least one content from an external electronic device (not shown) (e.g., the electronic device 102 or 104 or the server 108 in FIG. 1) or an image (e.g., a still image or a moving image) captured by the camera module 180 of the electronic device 101, and store it in the memory 130.

According to an embodiment, in response to a request to set at least one content, the at least one processor 120 may display a settings screen of the application, and display preview images (e.g., thumbnails) corresponding to at least one content or captured images stored in the memory 130 on the settings screen. The at least one processor 120 may select at least one preview image from among the images displayed on the settings screen, and set at least one content or image corresponding to the selected at least one preview image as background content to be displayed in the first area 211. For example, the at least one processor 120 may identify size information and/or arrangement information about the display based on information about a form factor associated with the shape or structure of the electronic device. The electronic device 101 may adjust the size of the content or image corresponding to the selected at least one preview image or crop out a partial area of the content or image, based on at least one of the size information, the arrangement information, or state information (e.g., activated or deactivated state) about the display, and set the content or image as the background content to be displayed in the first area 211. The at least one processor 120 may store the at least one content set as the background content in the memory 130. The at least one set content may include, for example, at least one of a wallpaper, a still image, a moving image, or an animated image as a background image, and include context-based content information such as a clock, weather information, or an incoming message.

According to an embodiment, the at least one processor 120 of the electronic device 101 may identify the open or closed state of the cover 203 using at least one sensor (e.g., the sensor module 176 in FIG. 1).

According to an embodiment, when the cover 203 is in the closed state, the at least one processor 120 may control the display 210 (e.g., the display module 160 in FIG. 1) to display the at least one set content in the first area 211. For example, when there are a plurality of contents to be displayed, the at least one processor 120 may display the plurality of contents sequentially or randomly in the first area 211. For example, the at least one processor 120 may control the display module 160 to display the at least one set content in the first area 211 for a specified period of time (e.g., N see) and, after the specified period of time elapses, deactivate the first area 211 for screen-off. Upon receipt of a button input, a screen touch input in the first area 211, or a specified gesture input, the at least one processor 120 may again activate the first area 211 and display the at least one content.

According to an embodiment, the at least one processor 120 may correct the at least one content to prevent/reduce burn-in which may result from displaying the at least one content in the first area 211. The at least one processor 120 may correct the selected at least one content by applying an image for preventing/reducing or avoiding burn-in to the selected at least one content on the settings screen of the application. The at least one processor 120 may generate the image for preventing/reducing or avoiding burn-in such that a visual effect (e.g., dynamic gradient effect or fade-out effect) for preventing/reducing or avoiding burn-in is represented at a boundary area of the first area 211. The at least one processor 120 may generate an image (e.g., an overlay image) by adjusting color information of each pixel based on information related to pixels in the first area 211 and the boundary area of the first area 211 to produce the dynamic gradient effect or the fade-out effect. The information related to the pixels may include at least one of color information (e.g., RGB dynamic parameter), use time (e.g., the lifetime of a light emitting element of a pixel), or position information (e.g., the coordinate values of the pixel) about each of the pixels in the first area 211 or the boundary area of the first area 211. The generated image may have a size corresponding to the size of up to the boundary area of the first area 211 and be applied to an upper layer of the at least one content. The at least one processor 120 may generate the image by reflecting a dynamic change in visual effect over time based on the use time, color information (e.g., RGB dynamic parameter), or position information (e.g., pixel coordinate values) about the pixels in the boundary area. For example, when the at least one content is a plurality of contents, the generated image may be applied to the upper layer of each individual content. In another example, when the at least one content is a plurality of contents, the generated image may be applied to an uppermost layer of the plurality of contents.

In an embodiment, when setting the selected at least one content on the settings screen, the at least one processor 120 may correct the at least one content by applying the generated image. In an embodiment, when displaying the at least one set content in the first area 211 in the closed state of the cover 203, the at least one processor 120 may correct the at least one content by applying the generated image to the upper layer of the at least one content.

According to an embodiment, when displaying the at least one set content in the first area 211 in the closed state of the cover 203, the at least one processor 120 may expand, contract, or move the at least one content to prevent/reduce or avoid burn-in that may occur at the boundary of the first area 211. The at least one processor 120 may generate an image to produce a visual effect by adjusting the color information of the pixels in the first area 211 and its boundary area according to the expansion, contraction, or movement of the at least one content. The at least one processor 120 may correct the at least one content to be displayed by applying the generated image to the at least one content to be displayed by expanding, contracting, or moving the at least one content.

Figure 2A:
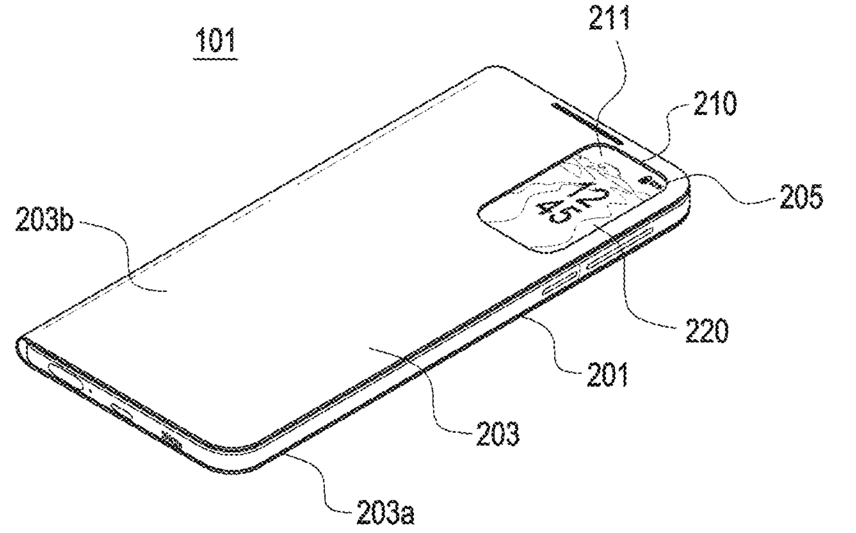
FIGS. 2A, 2B, 2C, and 2D are perspective views illustrating various example configurations of an electronic device according to an embodiment.

According to an embodiment, when the at least one processor 120 identifies that the cover 203 is in the closed state as illustrated in FIG. 2A, the at least one processor 120 may deactivate the display 210 and then control the display 210 to activate the cover screen of the first area 211 visually exposed through the hole 205 of the cover 203 and display at least one content including a cover image in the first area 211. When displaying the at least one content in the first area in the closed state of the cover 203, the at least one processor 120 may control the display module 160 to deactivate a second area 213, which is the remaining area of the display 210 except the first area 211. Deactivation of the display 210 may refer to a screen-off state (e.g., a black screen state) resulting from applying no electrical signal to the light emitting elements of the pixels of the display 210. Activation of the display 210 may refer to a screen-on state resulting from applying an electrical signal to the light emitting elements of the pixels of the display 210.

Figure 2B:
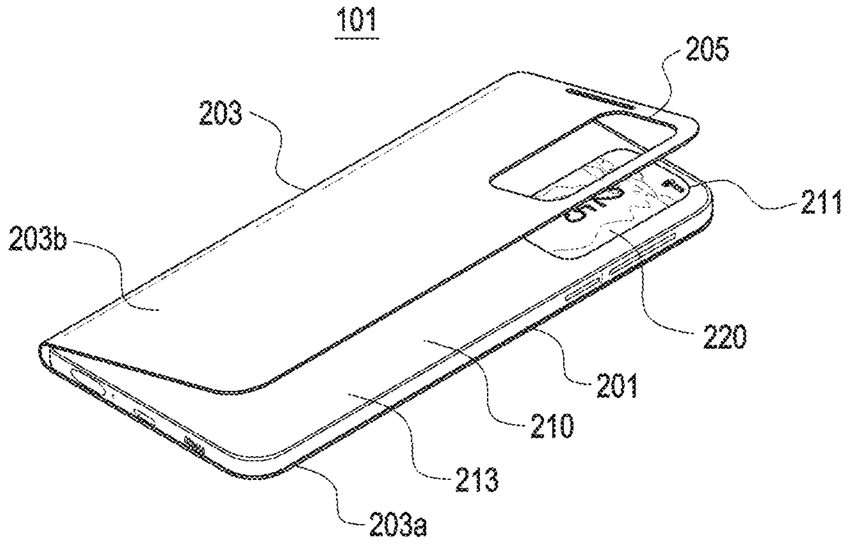
Figure 2C:
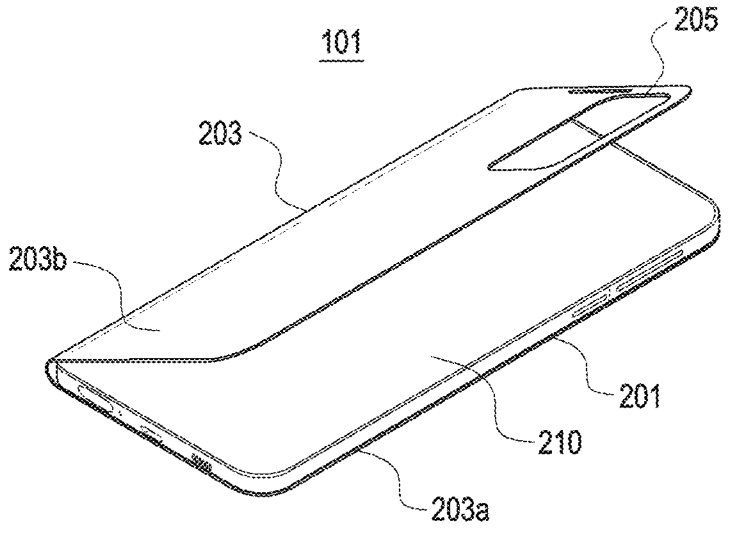
Figure 2D:
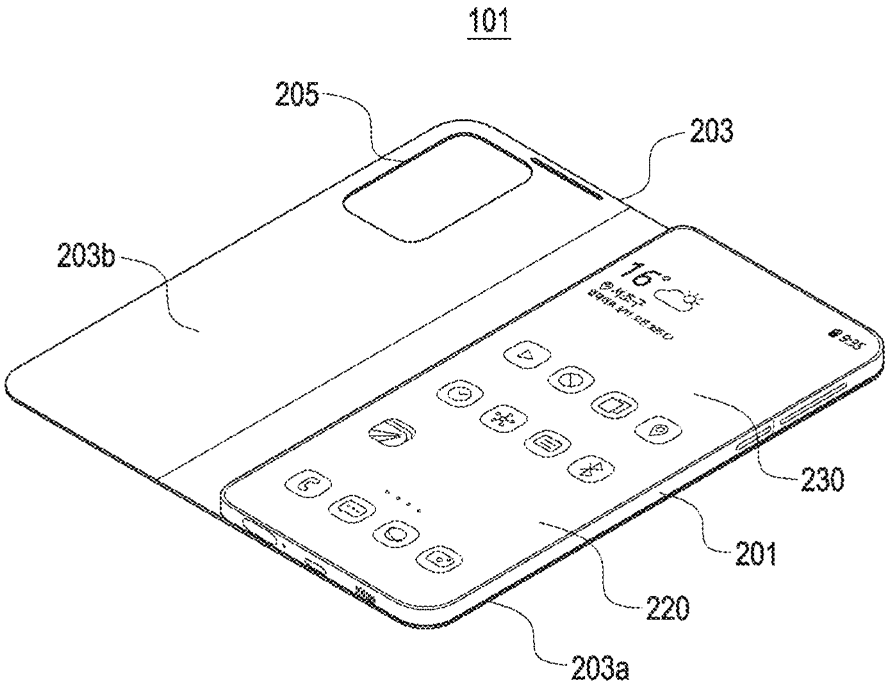

According to an embodiment, the at least one processor 120 may identify that the cover 203 has been switched to the open state using at least one sensor (e.g., the sensor module 176 in FIG. 1), as illustrated in FIG. 2B. When an angle between the second member **203*b* of the cover 203 and the display 210 is equal to or greater than a specified threshold after the cover 203 is switched to the open state, as illustrated in FIG. 2C, the at least one processor 120 may remove the at least one content displayed in the first area 211 of the display 210 and deactivate the display 210 to switch the entire screen to an off state. As illustrated in FIG. 2D, upon identifying that the cover 203 is fully open, the at least one processor 120 may activate the display 210 to display a set screen 230** (e.g., an initial screen, a home screen, a designated screen, or a previous execution screen).

According to an embodiment, when content is displayed during charging of the battery 189 of the electronic device 101 in the closed state of the cover 203, the at least one processor 120 may display a screen with a visual effect (e.g., dynamic gradient effect or fade-out effect) applied to it by adjusting color information (e.g., RGB dynamic parameter) to evenly use some pixels of the second area 213 based on a use time of pixels in the second area 213 except the first area 211. For example, when the at least one content is not displayed in the first area 211 during charging of the battery 189, the at least one processor 120 may display a screen with a visual effect (e.g., the dynamic gradient effect or the fade-out effect) applied to it by adjusting color information (e.g., RGB dynamic parameters) about the pixels of the entire area of the display 210 based on the use time of the pixels of the entire area of the display 210.

The electronic device 101 according to an embodiment may be configured as a foldable, slidable, or rollable type, not limited to the above-described type of FIGS. 2A to 2D, and the operation for preventing/reducing or avoiding burn-in described with reference to FIGS. 2A to 2D may also be performed in the electronic device 101 of the foldable, slidable, or rollable type.

Figure 3A:
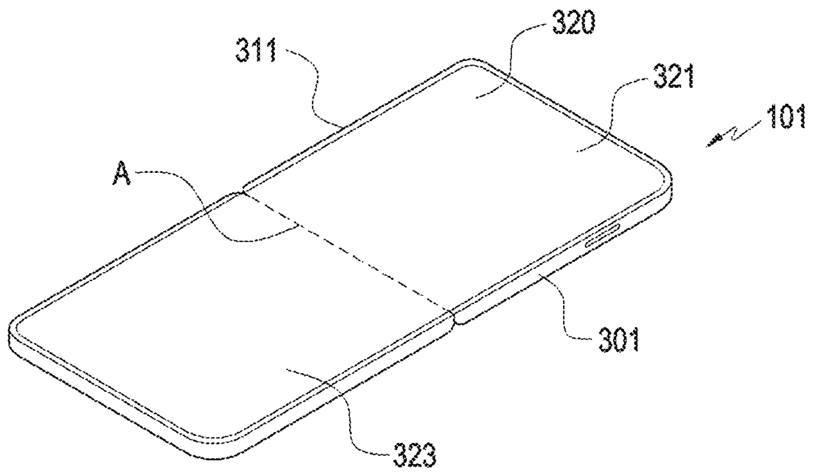
FIGS. 3A and 3B are perspective views illustrating example configurations of another type of electronic device according to an embodiment.
Figure 3B:
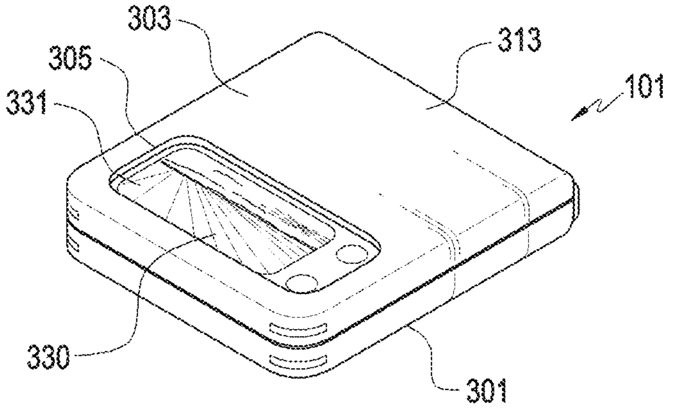

FIGS. 3A and 3B are diagrams illustrating example configurations of another type of electronic device according to an embodiment.

Referring to FIGS. 3A and 3B, the electronic device 101 according to an embodiment may be a foldable type, and include a first display 320 disposed on a first surface 311 of a housing 301 and a second display 330 disposed on a second surface 313 of the housing 301. The first display 320 may be folded or unfolded such that two areas 321 and 323 face each other with respect to a reference line A, to which the disclosure is not limited. The first display 320 may be folded such that the two areas 321 and 323 are away from (or opposite to) each other with respect to the reference line A. When the electronic device 101 is configured as a foldable type, a cover 303 may be mounted to surround a portion of the second surface 313 (e.g., rear surface) and side surfaces (e.g., a top side surface, a bottom side surface, a left side surface, and a right side surface) of the housing 301. The cover 303 may include a hole 305 to expose a partial area of the display 330 disposed on the second surface 313. For example, a member covering the second surface 313 of the housing 301 in the cover 303 may be configured to be open or closed. For example, the hole 305 of the cover 303 may be smaller in size than the second display 330.

When the areas 321 and 323 of the display 320 are folded at an angle equal to or greater than a specified threshold angle to face each other with respect to the reference line A, the at least one processor 120 of the electronic device 101 according to an embodiment may deactivate the first display 320, and when identifying that the cover 303 is in the closed state, the at least one processor 120 may activate a first area 331 of the second display 330 (e.g., the first area 211 in FIGS. 2A and 2B) to display at least one set content. When identifying that the cover 303 is in the open state, the at least one processor 120 may display a set screen on the second display 330. The at least one content may be corrected to have a size greater than the size of the first area 331, and may be background content to which an image for preventing/reducing or avoiding burn-in is applied. The at least one processor 120 may perform the same operation for generating an image for preventing/reducing burn-in and preventing/reducing burn-in, as described with reference to FIGS. 2A to 2D, and thus its detailed description may not be repeated here.

Figure 4:
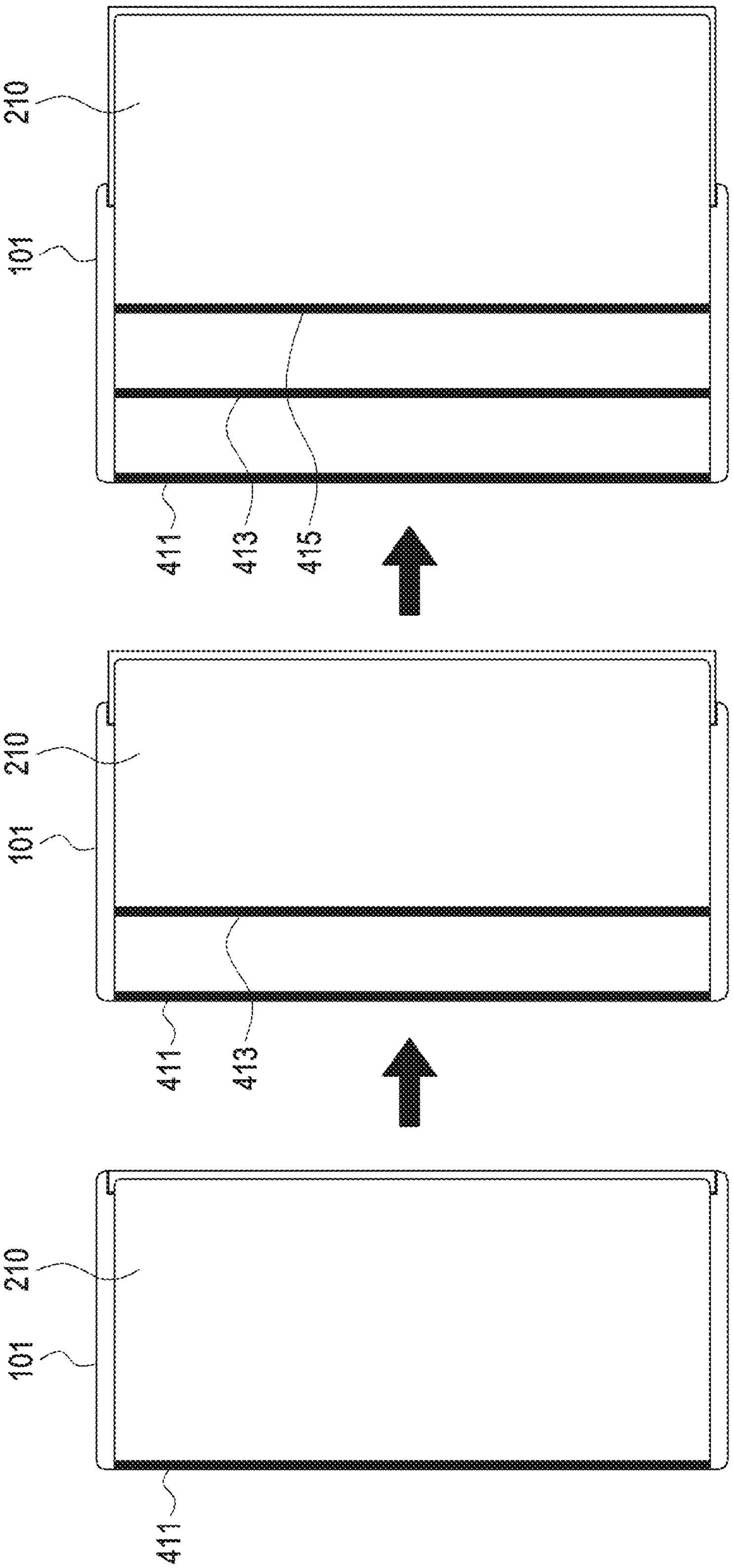
FIGS. 4 and 5 are diagrams and perspective views illustrating various example configurations of another type of electronic device according to an embodiment.
Figure 5:
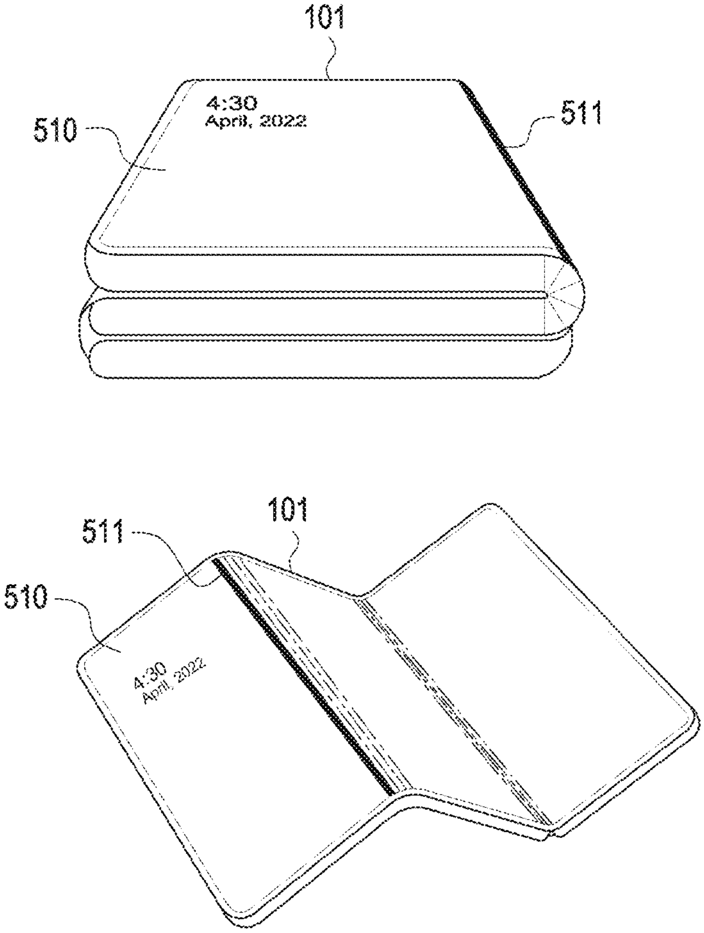

FIGS. 4 and 5 are diagrams and perspective views illustrating example configurations of various types of electronic devices according to an embodiment.

Referring to FIG. 4, when the electronic device 101 is configured as a slidable type according to an embodiment, the at least one processor 120 may correct at least one content to avoid burn-in at boundary areas 411, 413, and 415 on a display screen, as the display 210 is extended. The at least one processor 120 may compensate for color differences of pixels in the boundary areas 411, 413, and 415 by applying, to the at least one content, an image generated such that a visual effect (e.g., dynamic gradient effect or fade-out effect) is represented in the boundary areas 411, 413, and 415. The at least one processor 120 may adjust color information (e.g., gray levels of RGB dynamic parameters) about pixels in the boundary areas 411, 413, and 415. The at least one processor 120 may expand or contract the at least one content or move a display position of the at least one content, based on position information about the boundary areas 411, 413, and 415 to avoid burn-in in the boundary areas 411, 413, and 415 on the display screen.

Referring to FIG. 5, when the electronic device 101 according to an embodiment is configured as a foldable form, as a display 510 is extended, the at least one processor 120 may correct at least one content to avoid burn-in in a boundary area 511 on a display screen. The at least one processor 120 may adjust color information (e.g., gray levels of RGB dynamic parameters) about pixels in the boundary area 511 to compensate for a color difference using a visual effect (e.g., dynamic gradient effect or fade-out effect) in the boundary area 511. The at least one processor 120 may expand or contract the at least one content, or move a display position of the at least one content, based on position information about the boundary area 511 to avoid burn-in in the boundary area 511 on the display screen.

As such, the electronic device 101 of FIG. 1, FIGS. 2A to 2D, and FIGS. 3 to 5 has been described to illustrate major components of an electronic device in an embodiment. However, in various embodiments, all of the components illustrated in FIG. 1, FIGS. 2A to 2D, and FIGS. 3 to 5 are not required, and the electronic device 101 may be implemented with more or fewer components than those illustrated. Further, the positions of the major components of the electronic device 101 described above with reference to FIG. 1, FIGS. 2A to 2D, and FIGS. 3 to 5 may be changed according to various embodiments.

According to an embodiment, an electronic device (e.g., the electronic device 101 in FIG. 1, FIGS. 2A to 2D, FIG. 3, FIG. 4, or FIG. 5) may include: a housing (e.g., the housing 201 in FIGS. 2A to 2D or the housing 301 in FIG. 3), a display (e.g., the display 210 in FIGS. 2A to 2D or FIG. 4, the second display 330 in FIG. 3, or the display 510 in FIG. 5), at least one processor (e.g., the processor 120 in FIG. 1), comprising processing circuitry, and memory (e.g., the memory 130 in FIG. 1). According to an embodiment, the memory storing instructions that, when executed individually and/or collectively by the at least one processor, cause the electronic device to: set at least one content to be displayed in a first area of the display in a closed state of a cover (e.g., the cover 203 in FIGS. 2A to 2D or the cover 303 in FIG. 3) mounted on a portion of the housing, generate an image for preventing or reducing burn-in from occurring in the first area, and correct the at least one set content by applying the generated image, and based on identifying that the cover is in the closed state, control the display to display the at least one corrected content in the first area and a portion of a boundary area of the first area. The first area may be a partial area of the display, visible without being covered by the cover in the closed state of the cover.

According to an example embodiment, the instructions cause the electronic device to: identify at least one of size information, arrangement information, or state information about the display, obtain information related to pixels of the first area based on the at least one of the size information, the arrangement information, or the state information about the display, and correct the at least one content based on the information related to the pixels. The information related to the pixels may include at least one of a use time, position information, or color information about each of the pixels.

According to an example embodiment, the instructions cause the electronic device to: generate the image based on the information related to the pixels to represent a visual effect in the boundary area of the first area, wherein the image may be generated in a size larger than the first area and applied to an upper layer of the at least one content.

According to an example embodiment, the instructions cause the electronic device to generate the image by adjusting gray levels of pixels in the boundary area within a specified distance from a boundary line of the first area, based on the information related to the pixels.

According to an example embodiment, the instructions cause the electronic device to: reduce a size of the at least one content to a size smaller than a size of the first area, based on the information related to the pixels, generate the image by adjusting gray levels of pixels in a portion of the first area and a portion of the boundary area to represent the visual effect in the portion of the first area and the portion of the boundary area, based on the reduction of the size of the at least one content, and correct the at least one content of the reduced size by applying the generated image.

According to an example embodiment, the instructions cause the electronic device to: increase a size of the at least one content to a size larger than a size of the first area, based on the information related to the pixels, generate the image by adjusting gray levels of pixels in a portion of the first area and a portion of the boundary area to represent the visual effect in the portion of the first area and the portion of the boundary area, based on the increase of the size of the at least one content, and correct the at least one content of the increased size by applying the generated image.

According to an example embodiment, the instructions cause the electronic device to: identify a movement direction of the at least one content to be displayed in the first area, based on the information related to the pixels, generate the image by adjusting gray levels of pixels in a portion of the first area and a portion of the boundary area based on the identified movement direction to represent the visual effect in the portion of the first area and the portion of the boundary area, and correct the at least one content by applying the generated image. The at least one corrected content may be displayed in the first area and the boundary area by moving a specified distance in the identified movement direction, and displayed to represent the visual effect in the portion of the first area and the boundary area.

According to an example embodiment, the instructions cause the electronic device to: control the display to display the at least one content by dynamically adjusting color information about the at least one content displayed in the first area, based on the information related to the pixels.

According to an example embodiment, the instructions cause the electronic device to: based on a plurality of contents being set to be displayed in the first area, correct each of the plurality of contents by applying the generated image to an upper layer of each of the plurality of contents, store each of the plurality of corrected contents in the memory, and based on the first area being activated in the closed state, display the plurality of corrected contents.

Figure 6:
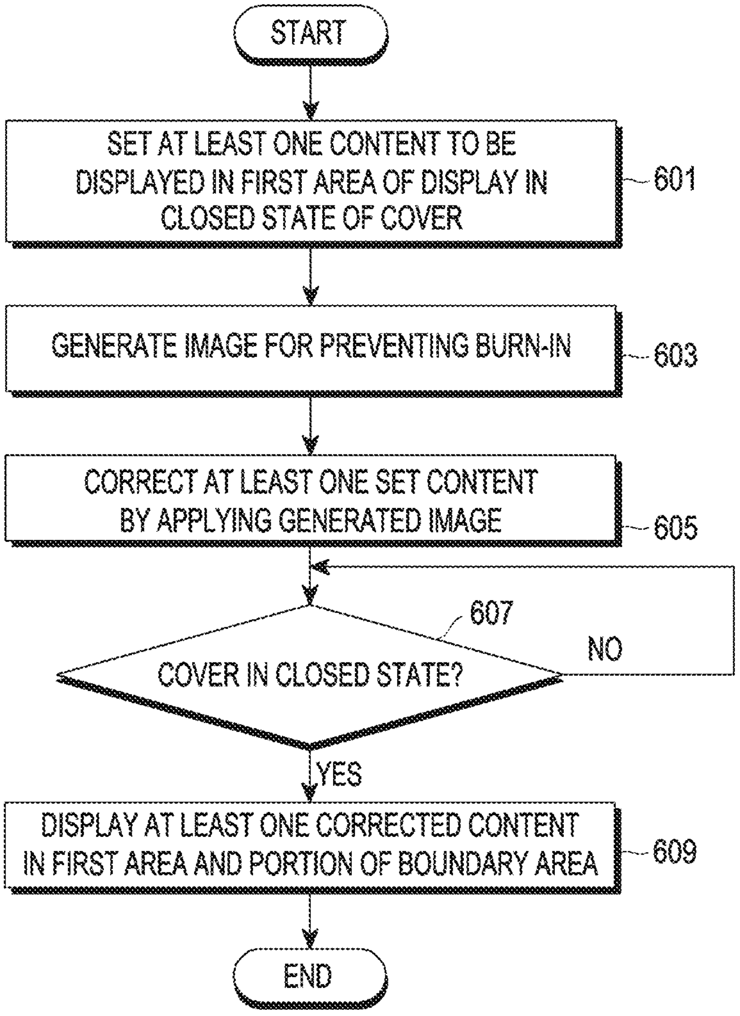
FIG. 6 is a flowchart illustrating an example method of operating an electronic device according to an embodiment.
Figure 7:
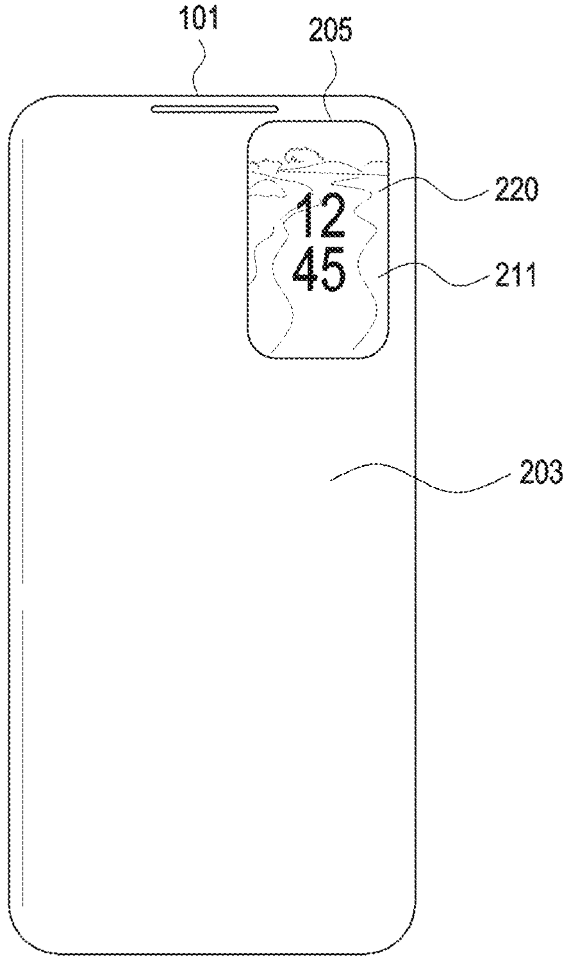
FIG. 7 is an example screen diagram illustrating an example method of operating an electronic device according to an embodiment.

FIG. 6 is a flowchart illustrating an example method of operating an electronic device according to various embodiments, and FIG. 7 is an example screen diagram illustrating an example method of operating an electronic device according to an embodiment.

Referring to FIGS. 6 and 7, according to an embodiment, in the closed state of the cover 203 (e.g., the cover 203 in FIGS. 2A to 2D or the cover 303 in FIG. 3) mounted on a portion of a housing (e.g., the housing 201 in FIGS. 2A to 2D or the housing 301 in FIG. 3), the electronic device 101 (e.g., the electronic device 101 in FIG. 1, FIGS. 2A to 2D, FIG. 3, FIG. 4, and FIG. 5) may set at least one content (e.g., a wallpaper, a still image, a moving image, or an animated image) to be displayed in the first area 211 (e.g., the first area 211 in FIGS. 2A to 2D or the first area 331 in FIG. 3) of a display (e.g., the display 210 in FIGS. 2A to 2D or FIG. 4, the second display 330 in FIG. 3, or the display 510 in FIG. 5) in operation 601. The first area 211 may be a portion of the display, which is visually exposed without being covered by the cover 203 in the closed state of the cover 203. The first area 211 may be configured in a different size and position depending on the type of the electronic device 101, and may be configured in a size equal to or larger than the size of the hole 205 included in the cover 203. The at least one content may be configured in a size equal to or larger than the size of the first area 211.

In operation 603, the electronic device 101 may generate an image for preventing/reducing or avoiding burn-in from occurring in the boundary area of the first area. The boundary area, which is a neighboring area of the first area 211, may be an area within a specified distance from each of boundary lines of the first area 211. Based on information related to pixels in the first area 211 or the boundary area of the first area 211, the electronic device 101 may generate the image for preventing/reducing or avoiding burn-in by adjusting color information about pixels in a boundary line portion and boundary area of the first area 211 such that a visual effect (e.g., dynamic gradient effect or fade-out effect) is represented in the boundary line portion and boundary area of the first area 211. The information related to the pixels may include at least one of color information (e.g., RGB dynamic parameter), a use time (e.g., a lifetime of a light emitting element of a pixel), or position information (e.g., coordinate values of a pixel) about each of the pixels in the first area 211 or the boundary area of the first area 211. Based on at least one of the color information (e.g., RGB dynamic parameter), use time (e.g., the lifetime of the light emitting element of the pixel), or position information (e.g., the coordinate values of the pixel) about each of the pixels in the first area 211 or the boundary area, the electronic device 101 may identify whether to increase or decrease the size of the at least one content or move the at least one content, for display. For example, when the electronic device 101 identifies that the at least one content is to be contracted or moved to be displayed, the electronic device 101 may generate the image for preventing/reducing or avoiding burn-in by adjusting color information about pixels in portions of the first area 211, in which the at least one content is not displayed, such that a dynamic gradient effect is represented in the portions of the first area 211.

In operation 605, the electronic device 101 may correct the at least one set content by applying the generated image. The electronic device 101 may correct the at least one content by applying the generated image to a layer above the layer of the at least one content such that the dynamic gradient effect is represented. Based on at least one of the color information (e.g., RGB dynamic parameters (r1, g1, and b1)), use times (e.g., a lifetime of a light emitting element of a pixel), or positional information (e.g., the coordinate values of a pixel) about the pixels in the first area 211 and the boundary area, the electronic device 101 may adjust the size of the at least one content to expand or contract the at least one content, and change a display position of the at least one content to move the at least one content, for display. The electronic device 101 may store the at least one corrected content 220 in memory (e.g., the memory 130 in FIG. 1).

In operation 607, the electronic device 101 may identify whether the cover 203 is in the closed state. The electronic device 101 may identify the open or closed state of the cover 203 using at least one sensor (e.g., the sensor module 176 in FIG. 1). When identifying that the cover 203 is in the closed state, the electronic device 101 may perform operation 609, and when identifying that the cover 203 is not in the closed state, the electronic device 101 may continue to perform operation 607. When identifying that the cover 203 is not in the closed state, the electronic device 101 may display a set screen by maintaining the entire area of the display in a deactivated state or an activated state.

In operation 609, when identifying that the cover 203 is in the closed state, the electronic device 101 may display the at least one corrected content 220 in the first area 211 and a portion of the boundary area. The at least one corrected content 220 may be displayed such that a visual effect (e.g., dynamic gradient effect or fade-out effect) is represented in the portion of the boundary area. For example, when there are a plurality of contents to be displayed in the first area 211, the electronic device 101 may display the plurality of contents sequentially. For example, the electronic device 101 may control the display 210 to display the at least one content in the first area 211 for a specified period of time, and when the specified period of time has elapsed, deactivate the first area 211 for screen-off. Upon receipt of a button input, a screen touch input in the first area 211, or a specified gesture input, the electronic device 101 may display the at least one content 220 by activating the first area 211 again.

Figure 8:
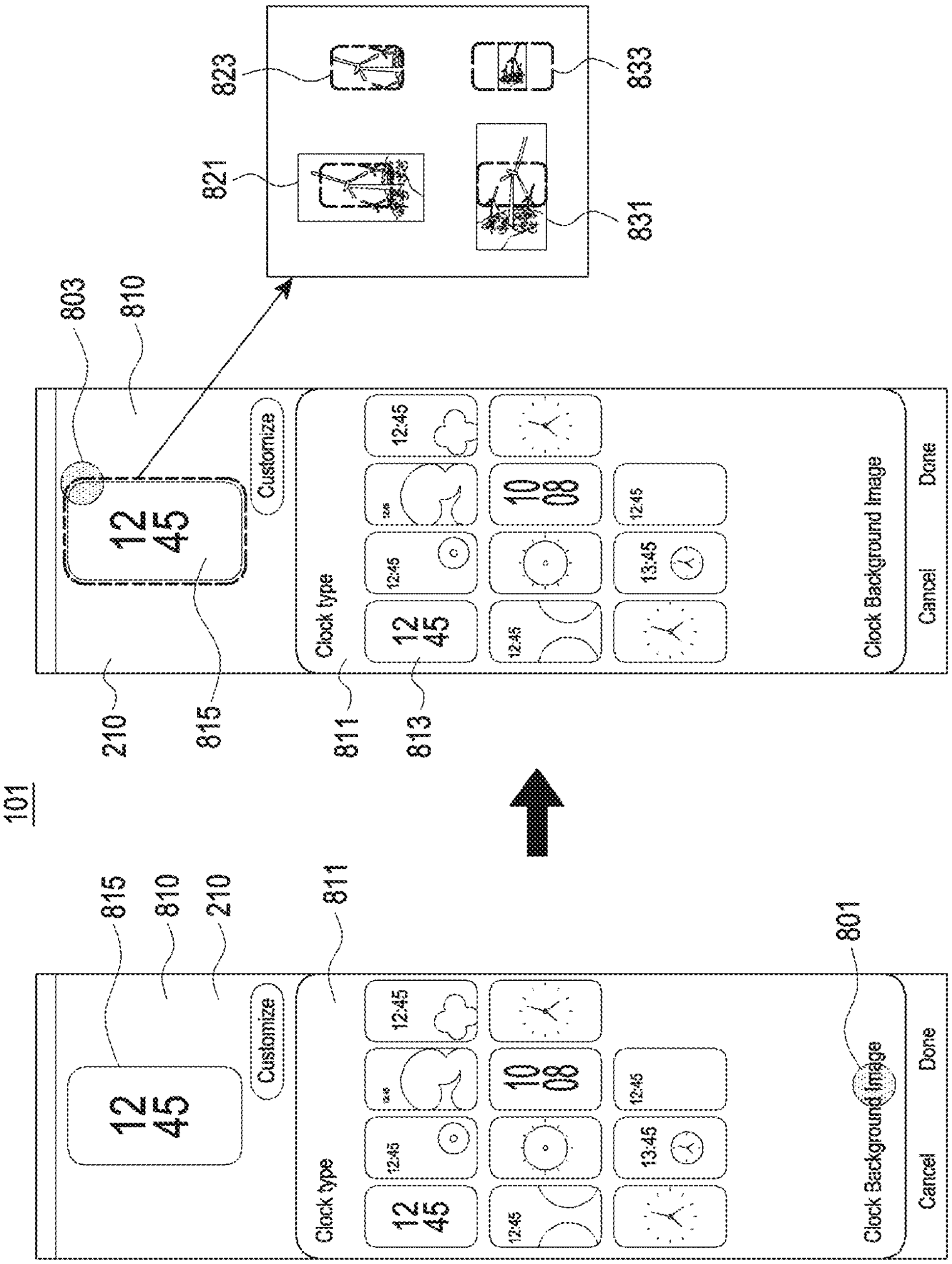
FIG. 8 is an example screen diagram illustrating an example method of operating an electronic device according to an embodiment.

FIG. 8 is an example screen diagram illustrating an example method of operating an electronic device according to an embodiment.

Referring to FIG. 8, the electronic device 101 (e.g., the electronic device 101 in FIG. 1, FIGS. 2A to 2D, FIG. 3, FIG. 4, and FIG. 5) according to an embodiment may execute an application for setting at least one content, when performing operation 601 of FIG. 6. In response to a request to execute the application, the electronic device 101 may set a style (e.g., clock style) of a cover screen to be displayed in the first area and set a display condition or display time for the cover screen, through a settings screen (not shown) of the application for setting the cover screen. The electronic device 101 may display a settings screen 810 for setting the style of the cover screen on the display 210, and display an image list 811 (e.g., clock types) including an image (e.g., a clock background image) representing each of a plurality of contents stored in the memory on the setting screen 810. In response to an image selection request 801, the electronic device 101 may select at least one image 813 from among the images included in the image list 811 displayed on the settings screen 810, and set at least one content 815 corresponding to the selected at least one image 813 as content to be displayed in the first area which is the cover screen. In response to an edit request 803 for the at least one content 815, the electronic device 101 may identify at least one of size information, arrangement information, or state information (e.g., activation state, on, or off) about the display based on information (e.g., information about a form factor) related to the size or shape of the electronic device 101. The electronic device 101 may set at least one edited content 823 and 833 as content to be displayed in the first area by resizing or cropping (e.g., pinch-cutting) original images 821 and 831 of the selected at least one content 815 based on the at least one of the size information, arrangement information, or state information (e.g., activated or deactivated) about the display.

Figure 9A:
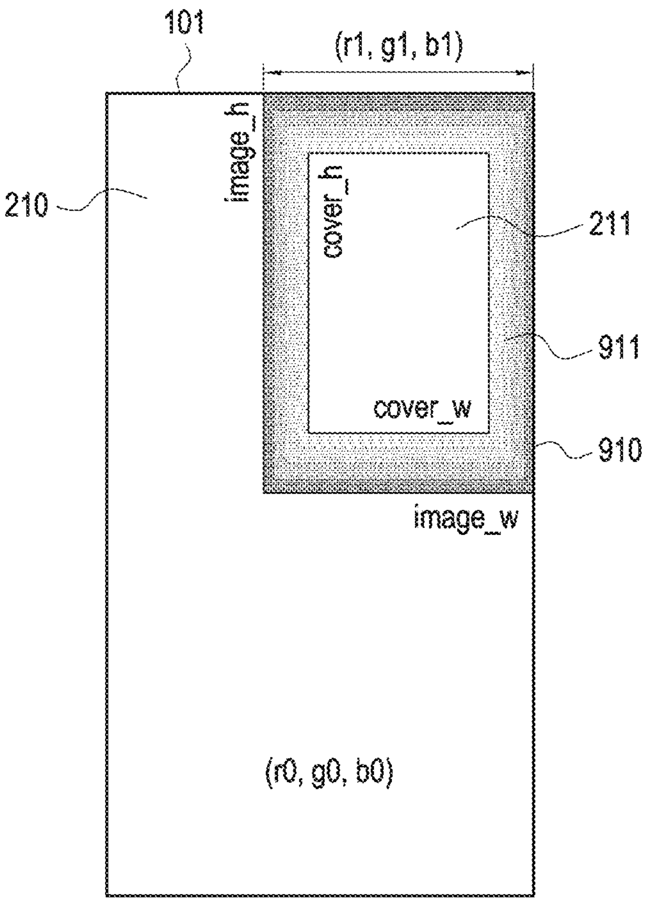
FIGS. 9A, 9B, 9C, and 9D are example screen diagrams and a graph illustrating an example method of operating an electronic device according to an embodiment.
Figure 9B:
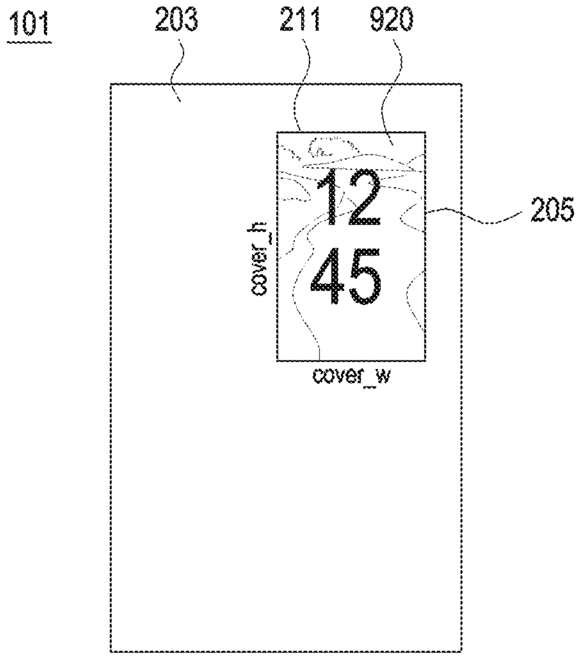
Figure 9C:
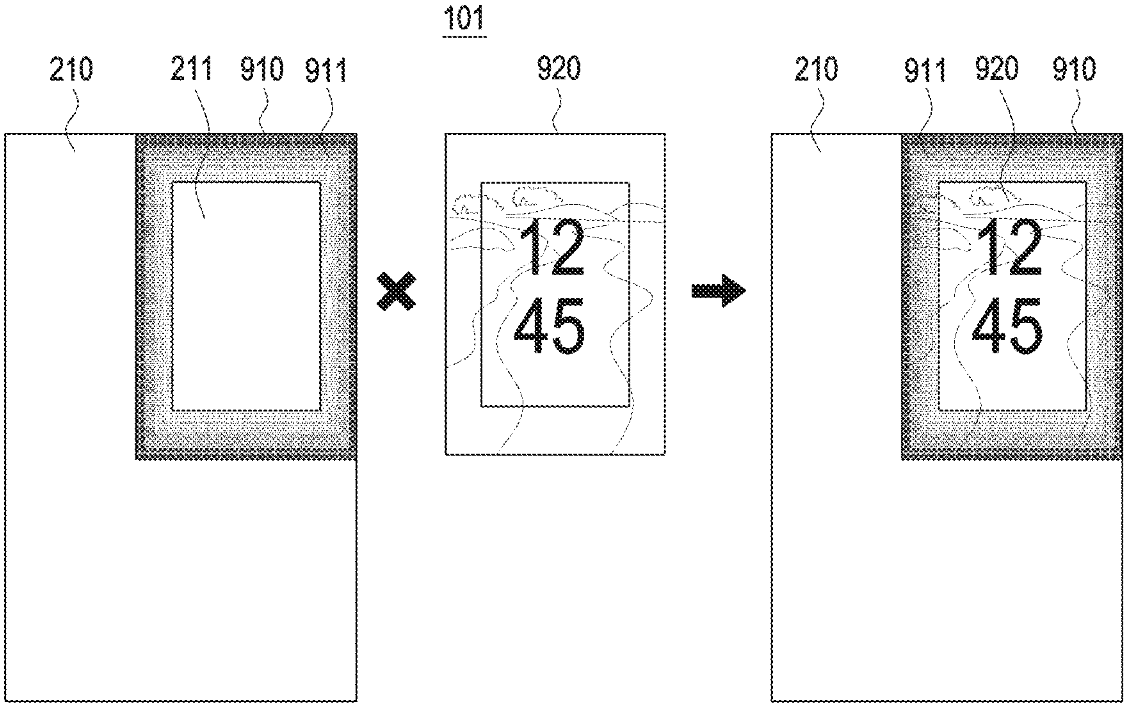
Figure 9D:
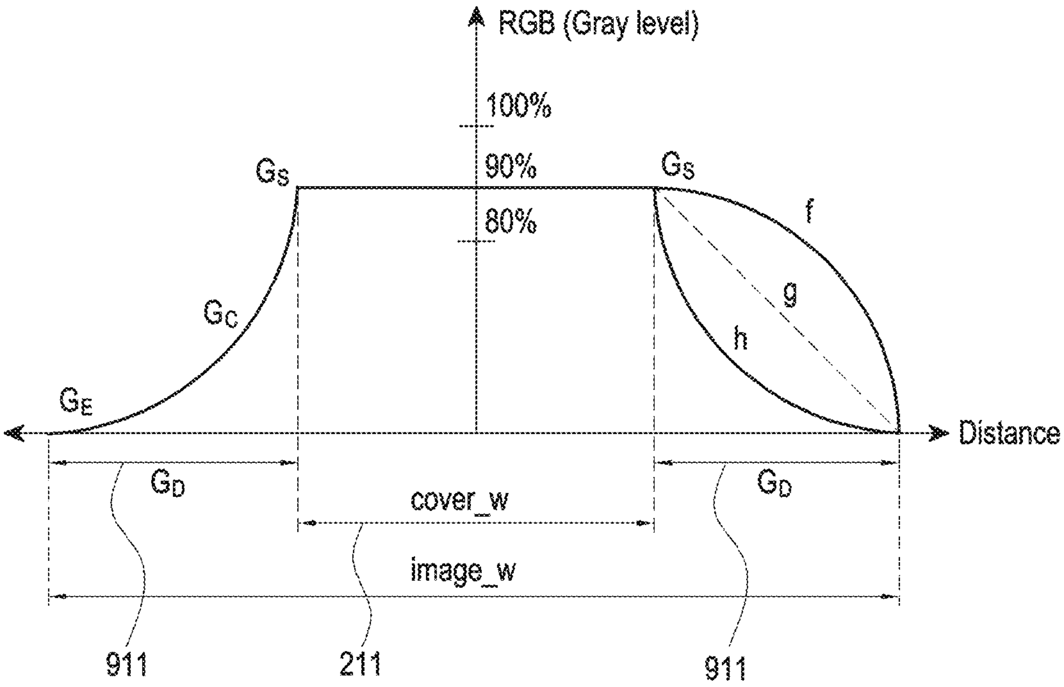
Figure 10A:
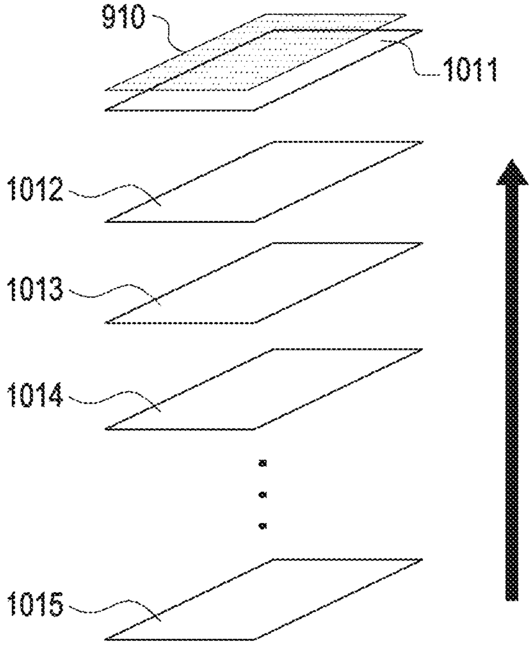
FIGS. 10A and 10B are diagrams illustrating an example method of operating an electronic device according to an embodiment.
Figure 10B:
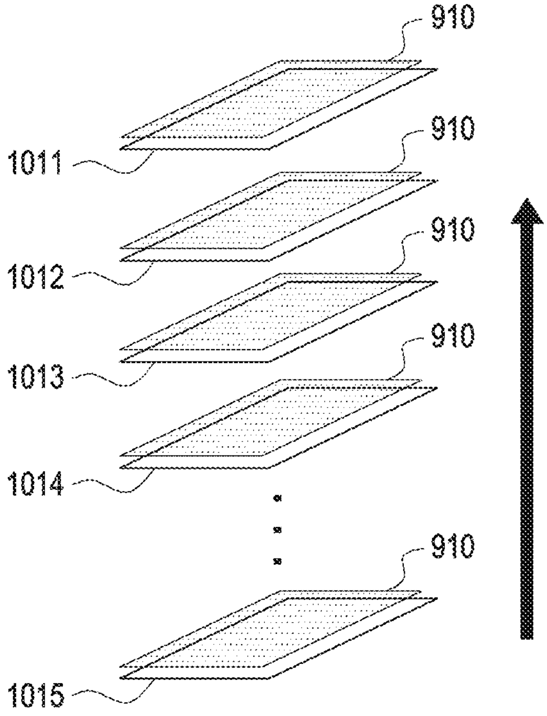

FIGS. 9A, 9B, 9C, and 9D include diagrams and a graph illustrating an example method for operating an electronic device according to various embodiments, and FIGS. 10A and 10B are exploded perspective views illustrating an example method of operating an electronic device according to an embodiment.

Referring to FIGS. 9A, 9B, 9C and 9D (which may be referred to as FIGS. 9A to 9D), when performing operations 603 and 605 of FIG. 6, the electronic device 101 (e.g., the electronic device 101 in FIG. 1, FIGS. 2A to 2D, FIG. 3, FIG. 4, and FIG. 5) according to an embodiment may generate an image 910 for preventing/reducing or avoiding burn-in, such that a dynamic gradient effect for preventing/reducing or avoiding burn-in is represented in a boundary area 911 of the first area 211. The boundary area 911, which is a neighboring area of the first area 211, may be within a specified distance (e.g., a gradient start-end distance $G_D$)) from each of the boundary lines of the first area 211. The electronic device 101 may generate the image 910 for preventing/reducing or avoiding burn-in by adjusting color information about pixels in a boundary line portion and the boundary area 911 of the first area 211 based on at least one of color information (e.g., RGB dynamic parameter), use time (e.g., a lifetime of a light emitting element of a pixel), or position information (e.g., the coordinate values of a pixel) about pixels in the first area 211 or the boundary area 911, such that a dynamic gradient effect is represented in the boundary line portion of the first area 211 and the boundary area 911. The generated image 910 may be generated in a size corresponding to an area including the first area 211 and the boundary area 911 and applied to an upper layer of at least one content 920. The electronic device 101 may set the size of the image 910 by calculating the width image_w and height imge_h of the image, as in <Equation 1> and <Equation 2> below. The electronic device 101 may set the size of a margin by considering positional match between the cover 203 and the image 910 and panel burn-in characteristics. In <Equation 1> below, cover_w may represent the width of the first area 211 made visible by the hole 205 of the cover 203, and in <Equation 2> below, cover_h may represent the height of the first area 211 made visible by the hole 205 of the cover 203.

$$\text{image\_w} = \text{cover\_w} * (1 + a) \text{ or } \text{cover\_w} + \text{margin\_w} \quad \text{[Equation 1]}$$

$$\text{image\_h} = \text{cover\_h} * (1 + b) \text{ or } \text{cover\_h} + \text{margin\_h} \quad \text{[Equation 2]}$$

When displaying the at least one content 920 in the first area 211 in the closed state of the cover 203, the electronic device 101 according to an embodiment may display the at least one content 920 configured to be larger than the hole 205 of the cover 203, as illustrated in FIGS. 9B and 9C. The electronic device 101 may display the image 910 such that a visual effect (e.g., gradient effect or fade-out effect) is represented in the boundary area 911 covered by the cover 203 on the display 210. As the image 910 is applied to the upper layer, the at least one content 920 may be displayed with the visual effect (e.g., gradient effect or fade-out effect) applied to a portion corresponding to the boundary area 911. The at least one content 920 may include, for example, at least one of a wallpaper, a still image, a moving image, or an animated image as a background image, and include context-based content information, such as a clock, weather information, or an incoming message.

The electronic device 101 may set a gray level for a gradient layer of the image displayed in the first area 211 of the display 210 and the boundary area 911 of the display 210, which is covered by the cover 203. For example, as illustrated in FIG. 9D, the gray level of the first area 211 (e.g., cover_w) may be set to 90%, and the gray level of the gradient distance (e.g., $G_D$) in the boundary area 911 may be set such that the gradient effect appears from the start point (e.g., a gradient start point $G_S$) of a boundary to the end point (e.g., a gradient end point $G_E$) of the boundary according to a gradient curve function (e.g., $G_c$=f(distance):convex curve or g(distance):linear or h(distance):concave curve) and a position-based boundary condition (e.g., $G_c(G_s)=(r_1, g_1, b_1)$ and $G_c(G_E)=(r_2, g_2, b_2)$).

According to an embodiment, when there are a plurality of contents to be displayed, the electronic device 101 may apply the generated image 910 to an uppermost layer of a plurality of contents 1011, 1012, 1013, 1014, and 1015, as illustrated in FIG. 10A. According to an embodiment, when there are a plurality of content to be displayed, the electronic device 101 may apply the generated image 910 to an upper layer of each of the plurality of contents 1011, 1012, 1013, 1014, and 1015, as illustrated in FIG. 10B.

FIGS. 11, 12, 13, and 14 are graphs illustrating an example method of operating an electronic device according to an embodiment.

When displaying at least one set content in the first area in the closed state of the cover, the electronic device according to an embodiment may correct the at least one content to be displayed by expanding, contracting, or moving the at least one content to prevent/reduce or avoid burn-in.

Figure 11:
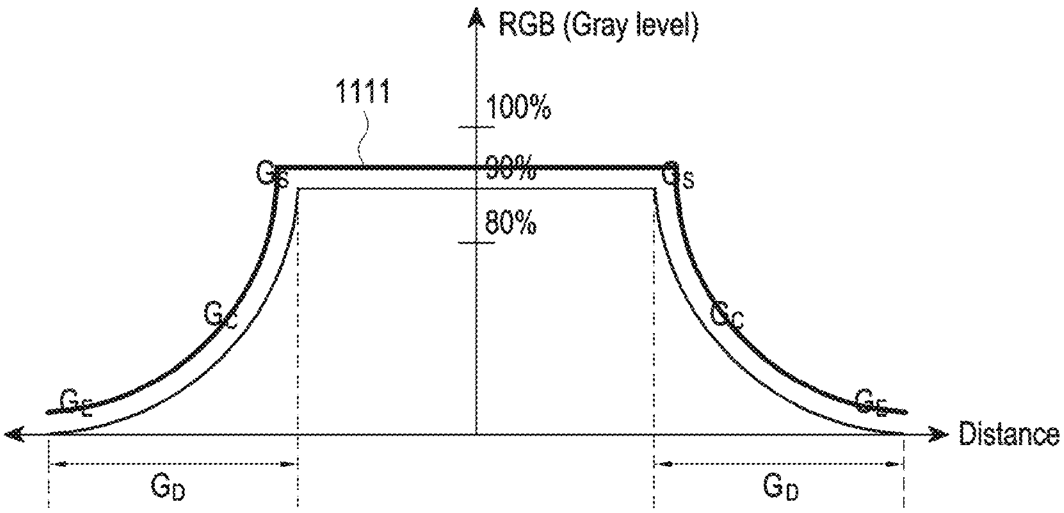
FIG. 11 is a graph illustrating an example method of operating an electronic device according to an embodiment.

According to an embodiment, when expanding the at least one content, the electronic device may generate an image for preventing/reducing or avoiding burn-in by adjusting color information about pixels in the first area 211 (e.g., cover_w) and the boundary area 911 to increase the gray level of the gradient distance (e.g., $G_D$) in the first area 211 (e.g., cover_w) and the boundary area 911, as illustrated in a graph 1111 of FIG. 11.

Figure 12:
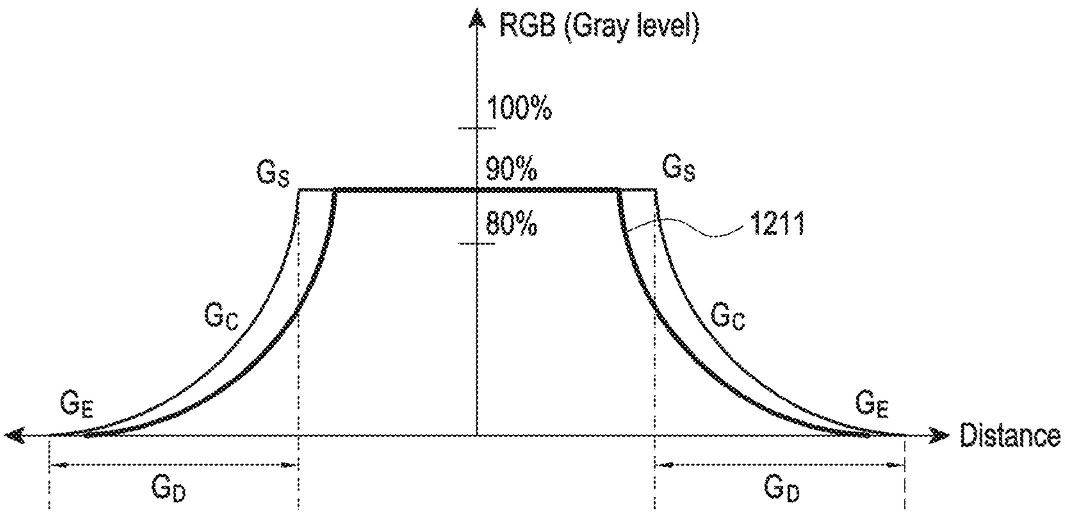
FIG. 12 is a graph illustrating an example method of operating an electronic device according to an embodiment.

According to an embodiment, when contracting the at least one content, the electronic device may generate an image for preventing/reducing or avoiding burn-in by adjusting color information about pixels in the first area 211 (e.g., cover_w) and the boundary area 911 to decrease the gray level of a partial area of the first area 211 (e.g., cover_w) and the gray level of a portion of the boundary area 911, as illustrated in a graph 1211 of FIG. 12.

Figure 13:
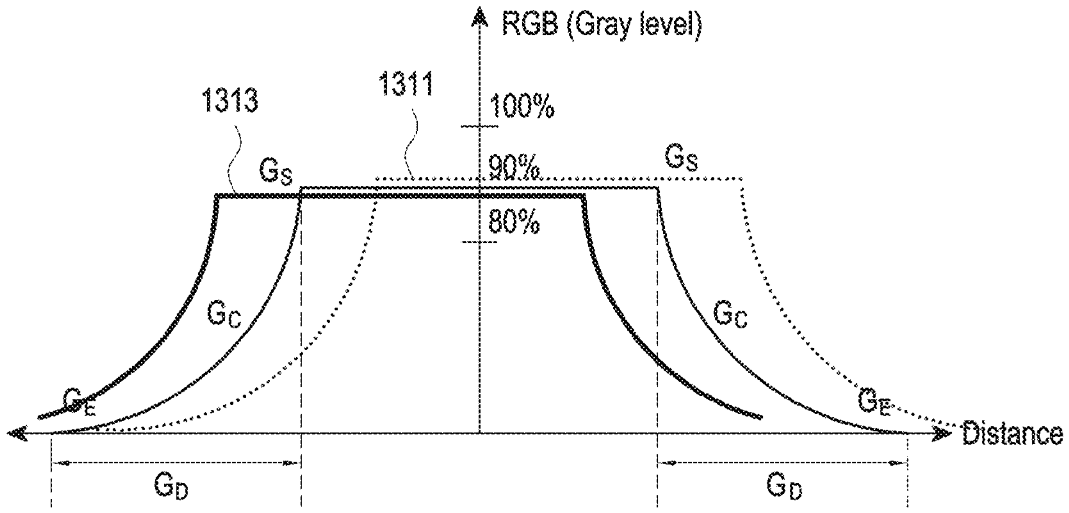
FIG. 13 is a graph illustrating an example method of operating an electronic device according to an embodiment.

According to an embodiment, as the at least one content is moved in a first direction, the electronic device 101 may generate an image for preventing/reducing or avoiding burn-in by adjusting the gray level of the gradient distance (e.g., $G_D$) in the first area 211 (e.g., cover_w) and the boundary area 911, as illustrated in a graph 1311 of FIG. 13. As the at least one content is moved in a second direction, the electronic device 101 may generate an image for preventing/reducing or avoiding burn-in by adjusting the gray level of the gradient distance (e.g., $G_D$) in the first area 211 (e.g., cover_w) and the boundary area 911, as illustrated in a graph 1313 of FIG. 13.

Figure 14:
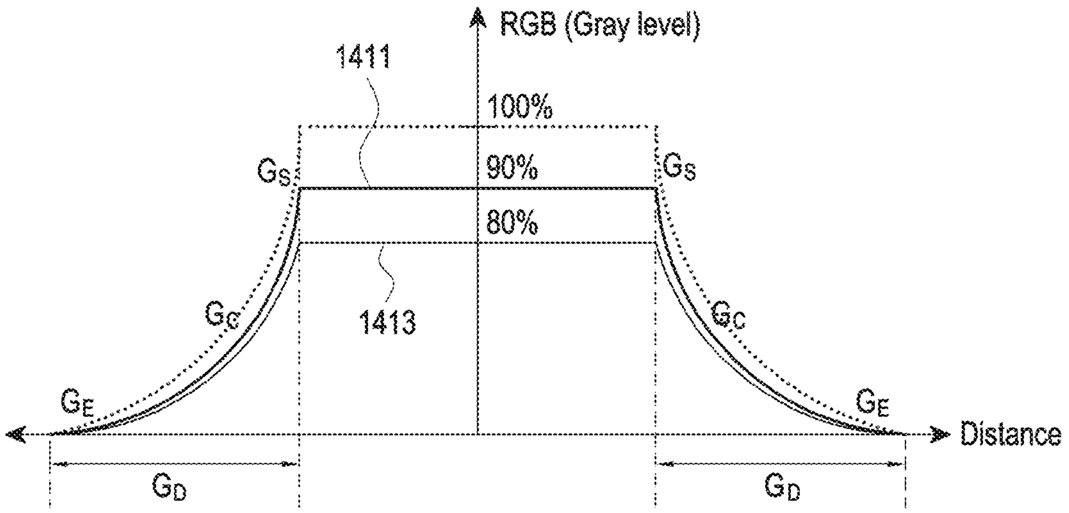
FIG. 14 is a graph illustrating an example method of operating an electronic device according to an embodiment.

According to an embodiment, the electronic device 101 may generate an image by reducing an RGB dynamic parameter (e.g., color value) of the at least one content (e.g., from reference values (e.g., 255, 255, 255) to reduced values (e.g., 220, 220, 220) for white pixel color values), as illustrated in a graph 1411 of FIG. 14. The electronic device 101 may generate the image by further reducing the RGB dynamic parameter (e.g., color value) of the at least one content (e.g., from reference values (e.g., 255, 255, 255) to reduced values (e.g., 204, 204, 204) for white pixel color values), as illustrated in a graph 1413 of FIG. 14.

According to an embodiment, when the battery 189 of the electronic device 101 is charged in the closed state of the cover 203, the electronic device 101 may adjust an RGB dynamic parameter to evenly use some pixels of the second area 213 based on the use time of pixels in the remaining second area 213 except the first area 211. For example, when at least one content is not displayed in the first area 211 during charging of the battery 189, the electronic device 101 may display a screen with a gradient effect applied to it by adjusting color information (e.g., RGB dynamic parameter) about the entire area of the display 210 based on the use time of pixels in the entire area of the display 210.

According to an example embodiment, a method of operating an electronic device (e.g., the electronic device 101 in FIG. 1, FIGS. 2A to 2D, FIG. 3, FIG. 4, or FIG. 5) may include: setting at least one content to be displayed in a first area of a display (e.g., the display 210 in FIGS. 2A to 2D or FIG. 4, the second display 330 in FIG. 3, or the display 510 in FIG. 5) of the electronic device in a closed state of a cover (e.g., the cover 203 in FIGS. 2A to 2D or the cover 303 in FIG. 3) mounted on a portion of a housing (e.g., the housing 201 in FIGS. 2A to 2D or the housing 301 in FIG. 3) of the electronic device, generating an image for preventing or reducing burn-in from occurring in the first area, correcting the at least one set content by applying the generated image, and based on identifying that the cover is in the closed state, displaying the at least one corrected content in the first area and a portion of a boundary area of the first area. The first area may be a partial area of the display, visible without being covered by the cover in the closed state of the cover.

According to an example embodiment, the method may further include: identifying at least one of size information, arrangement information, or state information about the display, and obtaining information related to pixels of the first area based on the at least one of the size information, the arrangement information, or the state information about the display. The at least one content may be corrected based on the information related to the pixels, and the information related to the pixels may include at least one of a use time, position information, or color information about each of the pixels.

According to an example embodiment, generating the image may include: generating the image by adjusting gray levels of pixels in the boundary area within a specified distance from a boundary line of the first area, wherein the image may be generated in a size larger than the first area and applied to an upper layer of the at least one content.

According to an example embodiment, generating the image may include: reducing a size of the at least one content to a size smaller than a size of the first area, based on the information related to the pixels, and based on the reduction of the size of the at least one content, generating the image by adjusting gray levels of pixels in a portion of the first area and a portion of the boundary area to represent the visual effect in the portion of the first area and the portion of the boundary area. The generated image may be applied to the at least one content of the reduced size.

According to an example embodiment, generating the image may include: increasing the size of the at least one content to a size larger than the size of the first area, based on the information related to the pixels, and based on the increase of the size of the at least one content, generating the image by adjusting gray levels of pixels in a portion of the first area and a portion of the boundary area to represent the visual effect in the portion of the first area and the portion of the boundary area. The generated image may be applied to the at least one content of the increased size.

According to an example embodiment, generating the image may include: identifying a movement direction of the at least one content to be displayed in the first area, based on the information related to the pixels, and generating the image by adjusting gray levels of pixels in a portion of the first area and a portion of the boundary area based on the identified movement direction to represent the visual effect in the portion of the first area and the portion of the boundary area. The generated image may be applied to the at least one content to correct the at least one content. The at least one corrected content may be displayed in the first area and the boundary area by moving a specified distance in the identified movement direction, and displayed to represent the visual effect in the portion of the first area and the boundary area.

According to an example embodiment, the method may further include: displaying the at least one content by dynamically adjusting color information about the at least one content displayed in the first area, based on the information related to the pixels.

According to an example embodiment, correcting the at least one set content may include: based on a plurality of contents being set to be displayed in the first area, correcting each of the plurality of contents by applying the generated image to an upper layer of each of the plurality of contents, and storing each of the plurality of corrected contents in memory (e.g., the memory 130 in FIG. 1) to display the plurality of corrected contents when the first area is activated in the closed state.

According to an example embodiment, generating the image may include: generating the image, based on the first area being activated in the closed state, and the generated image may be applied to the at least one content to be displayed overlapping an upper layer of the at least one content.

According to an example embodiment, in a non-transitory computer-readable storage medium storing a program, the program may include executable instructions which when executed by at least one processor of an electronic device (e.g., the electronic device 101 in FIG. 1, FIGS. 2A to 2D, FIG. 3, FIG. 4, and FIG. 5), individually and/or collectively, cause the electronic device to perform operations comprising: setting at least one content to be displayed in a first area of a display (e.g., the display 210 in FIGS. 2A to 2D or FIG. 4, the second display 330 in FIG. 3, or the display 510 in FIG. 5) of the electronic device in a closed state of a cover (e.g., the cover 203 in FIGS. 2A to 2D or the cover 303 in FIG. 3) mounted on a portion of a housing (e.g., the housing 201 in FIGS. 2A to 2D or the housing 301 in FIG. 3) of the electronic device, generating an image for preventing or reducing burn-in from occurring in the first area, correcting the at least one set content by applying the generated image, and based on identifying that the cover is in the closed state, displaying the at least one corrected content in the first area and a portion of a boundary area of the first area. The first area may be a partial area of the display, visible without being covered by the cover in the closed state of the cover.

The various example embodiments disclosed in the disclosure are presented for description and understanding of the disclosed technical content, and do not limit the scope of the disclosure. Therefore, the scope of the disclosure should be interpreted as encompassing all changes or various embodiments based on the technical idea of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “1$^{st}$” and “2$^{nd}$”, or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing;

a display;

at least one processor comprising processing circuitry; and memory storing instructions that, when executed individually and/or collectively by the at least one processor, cause the electronic device to:

set at least one content to be displayed in a first area of the display in a closed state of a cover mounted on a portion of the housing, wherein the first area is a partial area of the display corresponding to a size of a hole included in the cover and visible through the hole in the closed state of the cover;

generate an image for preventing or reducing burn-in from occurring in a boundary area of the first area adjacent to the hole such that a visual effect for preventing burn-in is represented at the boundary area of the first area, and correct the at least one set content by applying the generated image; and based on identifying that the cover is in the closed state, control the display to display the at least one corrected content in the first area, and wherein the image is generated in a size larger than the first area.

2. The electronic device of claim 1, wherein the instructions, when executed by the at least one processor individually and/or collectively, cause the electronic device to:

identify at least one of size information, arrangement information, or state information about the display;

obtain information related to pixels of the first area based on the at least one of the size information, the arrangement information, or the state information about the display;

correct the at least one content based on the information related to the pixels, and generate the image based on the information related to the pixels to represent the visual effect in the boundary area of the first area,;

wherein the information related to the pixels includes at least one of a use time, position information, or color information about each of the pixels,; and wherein the image is applied to an upper layer of the at least one content.

3. The electronic device of claim 2, wherein the instructions, when executed by the at least one processor individually and/or collectively, cause the electronic device to generate the image by adjusting gray levels of pixels in the boundary area within a specified distance from a boundary line of the first area, based on the information related to the pixels.

4. The electronic device of claim 3, wherein the instructions, when executed by the at least one processor individually and/or collectively, cause the electronic device to:

reduce a size of the at least one content to a size smaller than a size of the first area, based on the information related to the pixels, based on the reduction of the size of the at least one content, generate the image by adjusting gray levels of pixels in a portion of the first area and a portion of the boundary area to represent the visual effect in the portion of the first area and the portion of the boundary area, and correct the at least one content of the reduced size by applying the generated image.

5. The electronic device of claim 3, wherein the instructions, when executed by the at least one processor individually and/or collectively, cause the electronic device to:

increase a size of the at least one content to a size larger than a size of the first area, based on the information related to the pixels, based on the increase of the size of the at least one content, generate the image by adjusting gray levels of pixels in a portion of the first area and a portion of the boundary area to represent the visual effect in the portion of the first area and the portion of the boundary area, and correct the at least one content of the increased size by applying the generated image.

6. The electronic device of claim 3, wherein the instructions, when executed by the at least one processor individually and/or collectively, cause the electronic device to:

identify a movement direction of the at least one content to be displayed in the first area, based on the information related to the pixels, generate the image by adjusting gray levels of pixels in a portion of the first area and a portion of the boundary area based on the identified movement direction to represent the visual effect in the portion of the first area and the portion of the boundary area, and correct the at least one content by applying the generated image, and wherein the at least one corrected content is displayed in the first area and the boundary area by moving a specified distance in the identified movement direction, and displayed to represent the visual effect in the portion of the first area and the boundary area.

7. The electronic device of claim 3, wherein the instructions, when executed by the at least one processor individually or collectively, cause the electronic device to control the display to display the at least one content by dynamically adjusting color information about the at least one content displayed in the first area, based on the information related to the pixels.

8. The electronic device of claim 1, wherein the instructions, when executed by the at least one processor individually and/or collectively, cause the electronic device to:

based on a plurality of contents being set to be displayed in the first area, correct each of the plurality of contents by applying the generated image to an upper layer of each of the plurality of contents;

store each of the plurality of corrected contents in the memory; and based on the first area being activated in the closed state, display the plurality of corrected contents.

9. The electronic device of claim 1, wherein the instructions, when executed by the at least one processor individually and/or collectively, cause the electronic device to:

based on the first area being activated in the closed state, generate the image for preventing or reducing burn-in, and apply the generated image to the at least one content to display the image overlapping an upper layer of the at least one content; and based on the cover being in the closed state and charging of a battery of the electronic device being in progress, configure a screen for preventing or reducing burn-in by adjusting color information about pixels in a portion of a second area of the display except the first area, based on information related to pixels of the second area, and control the display to display the configured screen in the second area.

10. The electronic device of claim 1, wherein correcting the at least one set content by applying the generated image includes applying a gradation effect or a fade-out effect in the boundary area.

11. A method of operating an electronic device, the method comprising:

setting at least one content to be displayed in a first area of a display of the electronic device in a closed state of a cover mounted on a portion of a housing of the electronic device, wherein the first area is a partial area of the display corresponding to a size of a hole included in the cover and visible through the hole in the closed state of the cover;

generating an image for preventing or reducing burn-in from occurring in a boundary area of the first area adjacent to the hole such that a visual effect for preventing and/or reducing burn-in is represented at the boundary area of the first area;

correcting the at least one set content by applying the generated image; and based on identifying that the cover is in the closed state, displaying the at least one corrected content in the first area, and wherein the image is generated in a size larger than the first area.

12. The method of claim 11, further comprising:

identifying at least one of size information, arrangement information, or state information about the display; and obtaining information related to pixels of the first area based on the at least one of the size information, the arrangement information, or the state information about the display, wherein the at least one content is corrected based on the information related to the pixels, and wherein the information related to the pixels includes at least one of a use time, position information, or color information about each of the pixels.

13. The method of claim 12, wherein generating the image includes:

reducing a size of the at least one content to a size smaller than a size of the first area, based on the information related to the pixels; and based on the reduction of the size of the at least one content, generating the image by adjusting gray levels of pixels in a portion of the first area and a portion of the boundary area to represent the visual effect in the portion of the first area and the portion of the boundary area, wherein the generated image is applied to the at least one content of the reduced size, and wherein generating the image further includes:

increasing the size of the at least one content to a size larger than the size of the first area, based on the information related to the pixels; and based on the increase of the size of the at least one content, generating the image by adjusting gray levels of pixels in a portion of the first area and a portion of the boundary area to represent the visual effect in the portion of the first area and the portion of the boundary area, wherein the generated image is applied to the at least one content of the increased size.

14. The method of claim 12, wherein generating the image includes:

identifying a movement direction of the at least one content to be displayed in the first area, based on the information related to the pixels; and generating the image by adjusting gray levels of pixels in a portion of the first area and a portion of the boundary area based on the identified movement direction to represent the visual effect in the portion of the first area and the portion of the boundary area, wherein the generated image is applied to the at least one content to correct the at least one content, and wherein the at least one corrected content is displayed in the first area and the boundary area by moving a specified distance in the identified movement direction, and displayed to represent the visual effect in the portion of the first area and the boundary area.

15. The method of claim 12, further comprising: displaying the at least one content by dynamically adjusting color information about the at least one content displayed in the first area, based on the information related to the pixels, wherein correcting the at least one set content includes:

based on a plurality of contents being set to be displayed in the first area, correcting each of the plurality of contents by applying the generated image to an upper layer of each of the plurality of contents; and storing each of the plurality of corrected contents in memory to display the plurality of corrected contents when the first area is activated in the closed state.

16. A non-transitory computer-readable storage medium storing a program including executable instructions which, when executed by at least one processor of an electronic device, individually and/or collectively, cause the electronic device to perform operations including:

setting at least one content to be displayed in a first area of a display of the electronic device in a closed state of a cover mounted on a portion of a housing of the electronic device, wherein the first area is a partial area of the display corresponding to a size of a hole included in the cover and visible through the hole in the closed state of the cover;

generating an image for preventing or reducing burn-in from occurring in a boundary area of the first area adjacent to the hole such that a visual effect for preventing and/or reducing burn-in is represented at the boundary area of the first area;

correcting the at least one set content by applying the generated image; and based on identifying that the cover is in the closed state, displaying the at least one corrected content in the first area wherein the image is generated in a size larger than the first area.

* * * * *